(12) United States Patent
Ifrim et al.

(10) Patent No.: US 8,487,496 B2
(45) Date of Patent: *Jul. 16, 2013

(54) POLE RETENTION CONFIGURATION FOR ELECTRIC MACHINE ROTORS

(75) Inventors: Costin Ifrim, Hamden, CT (US);
Michael Pothier, Leominster, MA (US);
James S. Smith, Old Lyme, CT (US);
Art O'Leary, Leominster, MA (US)

(73) Assignee: DRS Power Technology, Inc., Fitchburg, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/052,807

(22) Filed: Mar. 21, 2011

(65) Prior Publication Data

US 2011/0227441 A1 Sep. 22, 2011

Related U.S. Application Data

(63) Continuation of application No. 12/401,389, filed on Mar. 10, 2009, now Pat. No. 7,911,104.

(51) Int. Cl.
*H02K 1/28* (2006.01)
*H02K 1/27* (2006.01)

(52) U.S. Cl.
USPC ............ 310/156.59; 310/156.19; 310/156.55

(58) Field of Classification Search
USPC ............ 310/156.08–156.09, 156.12–156.19, 310/156.48, 156.55, 156.59, 156.77, 216.082, 310/216.086
See application file for complete search history.

(56) References Cited

U.S. PATENT DOCUMENTS

| 3,889,140 | A | | 6/1975 | Baermann |
| 4,588,914 | A | * | 5/1986 | Heyne ..................... 310/156.11 |
| 4,720,649 | A | | 1/1988 | Habermann et al. |
| 4,745,319 | A | | 5/1988 | Tomite et al. |
| 5,063,318 | A | | 11/1991 | Anderson |
| 5,091,668 | A | | 2/1992 | Cuenot et al. |
| 5,811,908 | A | | 9/1998 | Iwata et al. |
| 5,952,755 | A | * | 9/1999 | Lubas ..................... 310/156.19 |
| 5,973,435 | A | | 10/1999 | Irie et al. |
| 6,392,324 | B1 | | 5/2002 | Kuwahara |
| 6,548,932 | B1 | | 4/2003 | Weiglhfer et al. |
| 6,603,232 | B2 | | 8/2003 | Van Dine et al. |
| 8,004,140 | B2 | * | 8/2011 | Alexander et al. ........ 310/156.56 |
| 8,018,110 | B2 | * | 9/2011 | Alexander et al. ........ 310/156.56 |
| 2003/0034707 | A1 | * | 2/2003 | Smith ..................... 310/156.08 |
| 2006/0255679 | A1 | * | 11/2006 | Dine et al. .............. 310/156.55 |
| 2008/0024018 | A1 | * | 1/2008 | Rignault et al. ................ 310/42 |

FOREIGN PATENT DOCUMENTS

| FR | 2519483 | 7/1983 |
| GB | 2075274 | 11/1981 |
| WO | 2007063370 | 6/2007 |

* cited by examiner

*Primary Examiner* — Tran Nguyen
*Assistant Examiner* — Eric Johnson
(74) *Attorney, Agent, or Firm* — Kilpatrick Townsend & Stockton LLP

(57) ABSTRACT

A retention system in which rotor pole pieces are retained within complementarily shaped channels in a rotor hub, permanent magnets are secured between the pole pieces and within clamp members, and wedge-shaped pieces are used to apply positive locking forces along the axial length of each clamp member and of adjacent pole pieces. A curable resin preferably in disposed within gaps between the permanent magnets and the clamp members.

18 Claims, 3 Drawing Sheets

POLE RETENTION CONFIGURATION FOR ELECTRIC MACHINE ROTORS

CROSS REFERENCE TO RELATED APPLICATIONS

This application for Patent is a Continuation of U.S. patent application Ser. No. 12/401,389 filed Mar. 10, 2009 now U.S. Pat. No. 7,911,104, the teachings of which are incorporated herein by reference in their entirety.

This invention generally relates to electric machines such as permanent magnet heavy-duty electric machines, including generators and motors. More particularly, the invention relates to configurations for securing rotor pole pieces and permanent magnets relative to the rotors in relatively heavy duty rated machines.

BACKGROUND OF THE INVENTION

The use of permanent magnet motors in severe-duty applications is often hampered by difficulties in protecting the rotor magnets and retaining them on the rotor rim during high centrifugal loading. Under severe cyclic duty, rare earth magnets, e.g., NdFeB magnets, which can be very brittle, can experience heavy shock and vibration loads as well as high centrifugal forces. In some cases, the rotor experiences frequent and abrupt torque reversals that demand that the retention system also minimize assembly tolerances. Excessive magnet/retention system assembly clearances could permit movement of the magnets within the retaining configuration and cause damage to the magnets themselves. To compound matters, the magnets are inherently highly susceptible to chemical, corrosion and abrasive corrosion environmental attack and require a durable and resilient means of protection.

For larger permanent magnet motors, most magnet and pole retention systems utilize either circumferential composite outer bands or radial retention fasteners. In both cases, the retention forces are applied radially inward onto the magnets and directed toward the rotor axis or centerline to tighten the assembly and thereby more securely fasten the pole pieces to the rotor. Ideally, the retention systems should evenly distribute the radial forces on the poles such that the pole pieces are retained uniformly at all points along the axial length of the pole pieces to prevent uneven support during centrifugal loading. In practice the ideal is difficult to reach.

In nearly all cases, the retention systems are not ferromagnetic (that is to say, these systems, or at least those portions used to secure the poles, have relatively low magnetic permeability) in an effort to limit magnet flux leakage via the retention systems. Such leaked magnetic flux diminishes torque production. However, as a result, these systems increase the effective magnetic air gap, which in turn increases magnetic circuit reluctance. The increased reluctance weakens the flux emitted by the magnet within the circuit and increases its leakage flux. These both in turn also diminish torque production.

There is a demand of late for motors having lower noise characteristics. To satisfy this demand, as well as a desire for sinusoidal back EMF (electromotive force), rotor poles are shaped. This is called pole shaping. In some magnet retention systems, such as those utilizing hoop/band retention devices, it is difficult to use shaped poles because shaped poles can wear non-uniformly at their outer diameter.

Various systems and configurations for securing pole pieces have been described in the patent literature.

U.S. Pat. No. 6,548,932 to Weiglhofer, et al, describes U-shaped channel pieces oriented radially outward with permanent magnets contained within the channels defined by the U-shapes. Non-magnetic channel pieces are positioned between wedge-shaped ferromagnetic pole pieces. The channel pieces utilize a T-shaped protrusion at the base of the pieces to positively engage in a similarly shaped slot in a non-magnetic rotor surface to retain the poles pieces in the channels. No fasteners are required.

U.S. Pat. No. 5,973,435 to Irie, et al, describes a motor in which a series of soft resinous and non-magnetic magnet carrier members and cover faces are used. The magnets are secured to a non-magnetic retaining band or belt by means of the carrier members and the resulting band and magnets structure is secured about the rotor by means of the band.

U.S. Pat. No. 5,811,908 to Iwata, et al, describes a U-shaped retention channel constructed of ferromagnetic material. The channel is positioned over a permanent magnet and between adjacent pole pieces. The ends of the retention channel include lateral protrusions that interlock under corresponding protrusions extending from the adjacent pole pieces. The pole pieces are contoured to the shaped of the rotor outer surface and permanent magnets.

U.S. Pat. No. 4,179,634 to Burson describes a system in which a permanent magnet is restrained radially by means of ferromagnetic poles pieces located on either side of the magnet. The pole pieces interlock with protrusions in the rotor at the base of the magnet cavity and above the magnet itself by means of locking tabs located above the magnet. The entire assembly is secured by means of tapered roll pins made of ferromagnetic spring steel that extend the length of the magnet. The tapered roll pins draw the magnet radially inward within the cavity when inserted.

U.S. Pat. No. 4,745,319 to Tomite, et al, describes a U-shaped channel configuration used to secure magnets in a stator yoke assembly. The channels are oriented with the tops secured to the stator at the open ends and the closed ends placed within elastic retainers situated in grooves within edges of the permanent magnets. The channels are constructed of elastic non-magnetic material.

SUMMARY OF THE INVENTION

The present invention provides retentions systems in which permanent magnets and pole pieces are secured to and about a rotor by means of controllable positive locking forces.

In accordance with principles of the invention, a retention system can be provided in which manufacturing tolerances can be eased, yet the permanent magnets can be protected and secured to the rotor hub.

In an embodiment, the invention provides a retention system in which pole pieces are retained within complementarily shaped channels in a rotor hub, permanent magnets are secured between the pole pieces and within clamp members, and wedge pieces are used to apply positive locking forces along the axial length of each clamp member and of adjacent pole pieces.

In an embodiment, the invention provides a rotor retention system, comprising:

a rotor hub having a plurality of axially extending channels configured to receive therein complementarily shaped portions of pole pieces and effective to retain the pole pieces therein against centrifugal forces;

a plurality of axially extending clamp members configured with lateral extensions which engage under pole-hub gaps between the pole pieces and the rotor hub, the clamp members also configured to contain therein complementarily shaped permanent magnets; and for each permanent magnet, a pair of axially extending base wedge-shaped members configured to fit between the permanent magnet and the rotor hub, the base wedge-shaped members tapered to have inclined surfaces which engage against each other in sliding fashion, the base wedge-shaped members expanding laterally as thicker portions of the tapers abut and creating lateral forces that force the lateral extensions of the respective clamp member into the pole-hub gaps of adjacent pole pieces.

In accordance with principles of the invention, the positive locking forces, which are tangential to rotor, can be directly controlled by controlling the amount of force exerted by the base wedge-shaped members.

In an embodiment, the base wedge-shaped members are non-magnetic.

In an embodiment, the clamp members are ferromagnetic.

In an embodiment, the pole pieces are laminated and ferromagnetic.

In accordance with further principles of the invention, the clamp members completely encapsulate the permanent magnets.

These and other features and principles of the invention are described below in the detailed description of the presently preferred embodiments in connection with the accompanying drawings.

DETAILED DESCRIPTION OF THE PRESENTLY PREFERRED EMBODIMENTS

Reference will now be made to an implementation consistent with the present invention as illustrated in the accompanying drawings. Wherever possible, the same reference numbers will be used throughout the drawings and the following description to refer to the same or like parts.

Figure 1:
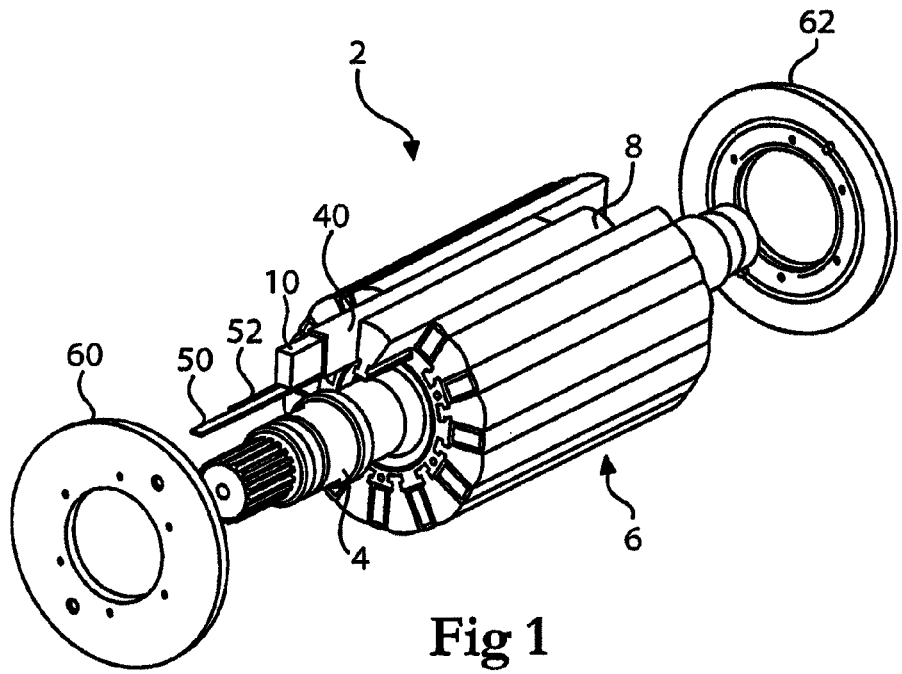
FIG. 1 illustrates in perspective partially exploded view a rotor assembly embodying principles of the intervention.

In FIG. 1, there is illustrated a rotor assembly 2, useful in permanent magnet electric machines. Generally, the rotor assembly 2 includes a suitably configured shaft 4 having a rotor hub or rotor tire 6 secured thereto or a part thereof that extends axially along and circumferentially about the shaft 4. As described in greater detail below, the hub or tire 6 is suitably configured to accept therein and thereon pole pieces 8 and permanent magnets 10.

The rotor hub 6 preferably is constructed of one or more nonmagnetic materials.

Figure 2:
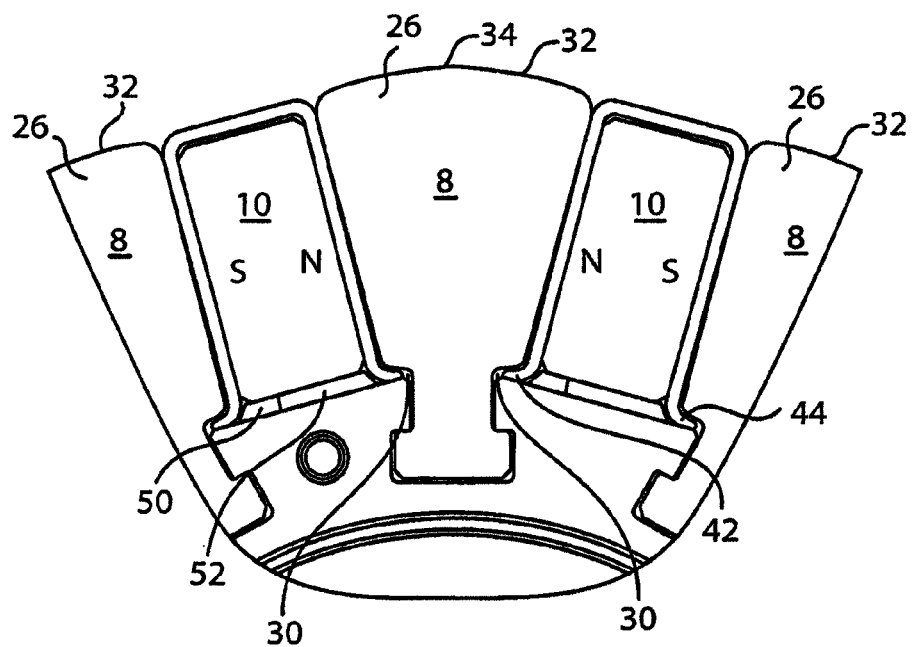
FIG. 2 illustrates in end view a portion of a rotor assembly of FIG. 1.
Figure 3:
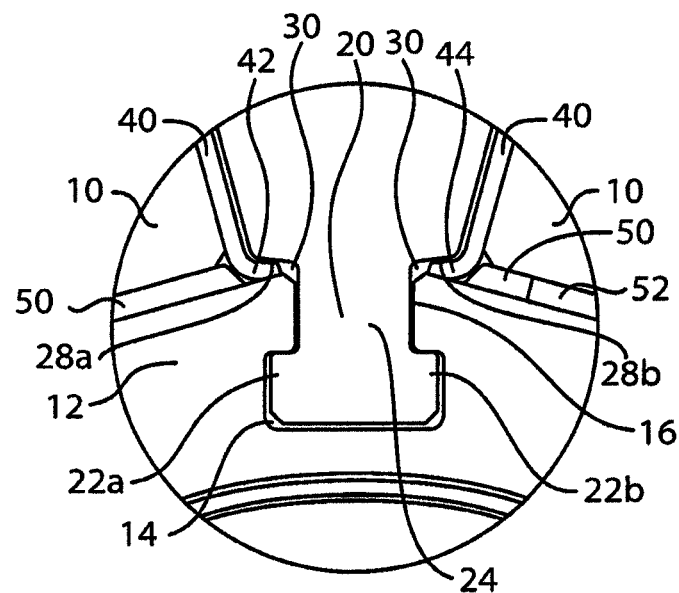
FIG. 3 illustrates in expanded view area A of the rotor assembly of FIG. 2.
Figure 4:
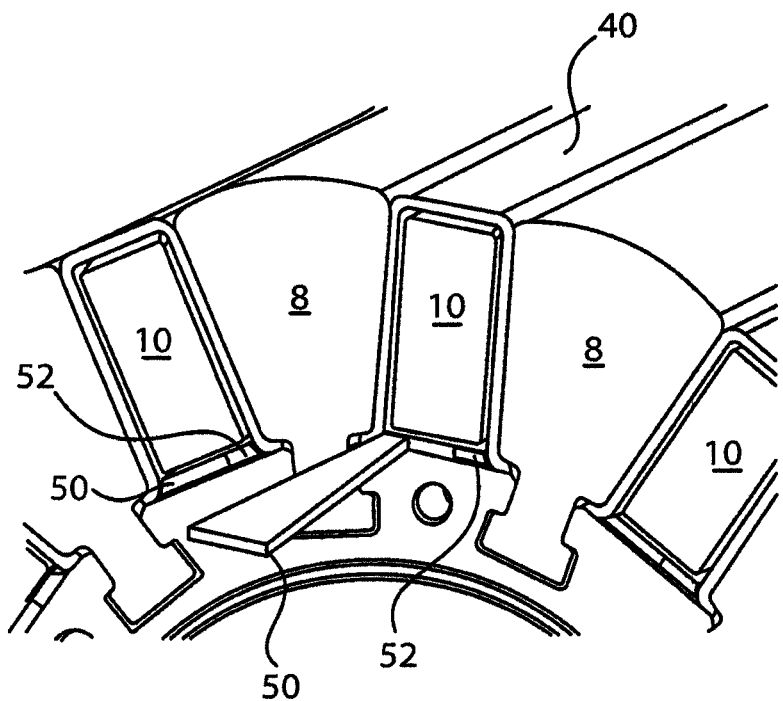
FIG. 4 illustrates in perspective view an end portion of the rotor assembly of FIG. 1.

With reference also to FIGS. 2-4, where an end portion of the rotor hub 6 is illustrated in various ways, the hub 6 includes axially-extending channels 12 formed about the circumference thereof which are substantially T-shape in cross-section. Preferably, the channels 12 are machined into the outer circumference of the hub 6. The hub 6 preferably is non-magnetic and made of a material such as stainless steel, high grade aluminum and/or composite materials The channels 12 are inverted relative to the outer circumference of the rotor hub 6 in the sense that a wider horizontal portion 14 of the "T" shape extends tangentially relative to the rotor hub 6 and is positioned within the rotor hub 6 to form a channel therein and a vertical portion or stem 16 of the "T" shapes extends radially from the channel 14 to outside of the rotor hub 6.

Secured within the channels 12 are the pole pieces 8, or at least portions thereof. To that end, the pole pieces 8 have retaining portions 20 shaped to conform to the shape of the channels 12, i.e., they are complementarily shaped. Each of these portions 20 includes a relatively horizontal portion 22, with laterally extending portions 22a and 22b that fit within the horizontal channel portion 14. Each portion 20 also includes a stem 24 the fits within its respective radially-extending vertical channel portion 16. As a result, the lateral extensions 22a and 22b serve to retain the pole pieces 8 within the channels 12 and to secure the pole pieces 8 against centrifugal forces. It can be appreciated that the formation of the channels 12 and the lateral extensions 22a and 22b must be such that all are strong enough to retain the pole pieces 8 therein even under high centrifugal forces.

The pole pieces 8 also include outer portions 26 that are positioned outside of the channels 12. Portions 26 are tangentially or laterally larger than the leg or stem 16 and thus provide outer surfaces 28a and 28b that face the rotor hub 6. The pole pieces 8 also include outer surfaces 32 that face the stator of the machine. In the illustrated embodiment, the outer surfaces 32 of the pole pieces are curved as appropriate to the desired characteristics of the rotor. The surfaces 32 have apexes 34 that define the outer circumference of the rotor assembly 2.

It can also be seen that pole-hub gaps 30a and 30b are provided in a space between the faces 28a and 28b and the rotor hub 6. The purpose and sizes of the pole-hub gaps 30a and 30b should be apparent below, but in any event, should be sufficient to accept hereunder an edge of which is wedged hereunder.

As also illustrated in FIGS. 1-4, between the pole pieces 8 are positioned permanent magnets 10. The magnets 10 are each secured within a cover 40, also referred to herein as a clamp or a wedge clamp 40, which is substantially U-shaped in cross-section. The clamps 40 include lateral extensions or projections 42 and 44 which extend from the open edges of the U-shape and under the rotor facing faces or sides 28a and 28b the pole pieces 8.

Preferably, the outer edges of the lateral extensions 42 and 44 are tapered in cross-section so as to provide a wedge-shape. The wedge-shape of the lateral extensions 42 and 44 resulting from the tapering of the extensions toward the outer edges thereof enhances the ability of the lateral extensions 42 and 44 to wedge into the gaps 30a and 30b. As a result, the covers 40, and hence the permanent magnets 10 can be effectively restrained against radial movement by the engagement of the lateral extensions 42 and 44 into the pole-hub gaps 30a and 30b and under and against the faces 28a and 28b of adjacent pole piece portions 26, as well as the rotor hub 6.

The wedge clamps 40 are secured in position by means of a pair of base wedge-shaped members 50 and 52, which are installed in opposing axial directions. Preferably, the base wedge-shaped members 50 and 52 are non-magnetic. The base wedge-shaped members 50 and 52 preferably are trapezoidal or triangular sections that form a rectangle when fully mated together. As can be appreciated the matting surfaces are the inclined surfaces of the trapezoids or triangles.

Because the base wedge-shaped members 50 and 52 are inserted into opposite ends of the space between the permanent magnet and the rotor hub, the inclined surfaces engaged slidingly as the base wedge-shaped 50 and 52 are moved axially toward the opposite ends from which they are inserted. As the base wedge-shaped members 50 and 52 engage along their inclined surfaces, outer edges of the base wedge-shaped members 50 and 52 facing the lateral extensions move toward the lateral extensions.

Figure 5A:
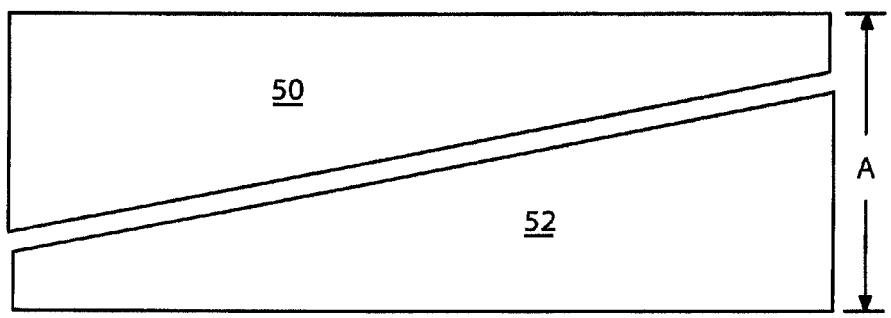
FIGS. 5a and 5b illustrate trapezoidal base wedge-shaped members and relative movement between them.
Figure 5B:
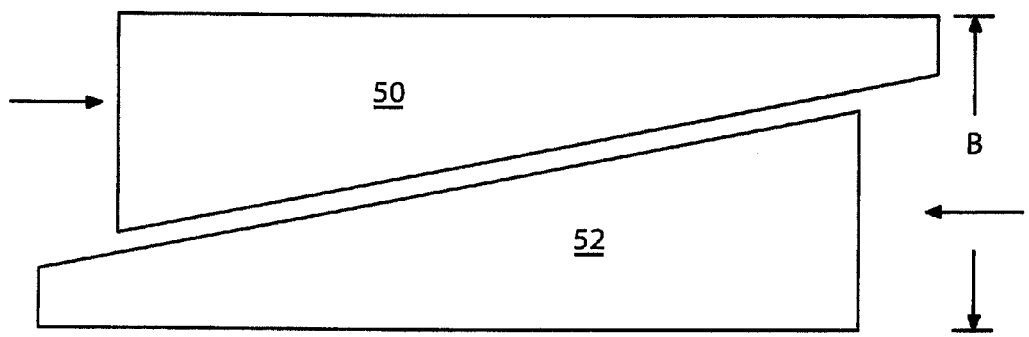

The foregoing is illustrated in FIGS. 5a and 5b where a pair of trapezoidal base wedge-shaped members 50 and 52 are shown in plan view with their mating inclined edges or surfaces 50a and 52a facing each other. A gap between the surfaces 50a and 52a is provided merely to assist in the illustration of the surfaces 50a and 52a. In reality, the surfaces 50a and 52b would abut each other in sliding engagement.

In FIG. 5a, the members 50 and 52 are shown then same relative axial position at the point where the surfaces would normally abut for the first time as they proceed axially in opposite directions. In FIG. 5a the non-inclined edges or surfaces 50b and 52b which engage against the lateral extensions 42 and 44 are at a distance "A" apart from each other.

However, in FIG. 5b, the base wedge-shaped members 50 and 52 are shown after an exaggerated axial movement relative to each in the directions indicated by the arrows. As can be seen the outer edges or surfaces 50b and 52b are now a distance "B" apart from each other. The distance "B" is necessarily greater than the distance "A."

Accordingly, as the base wedge-shaped members 50 and 52 meet and slidingly engage, they begin to exert lateral forces (tangential forces relative to the rotor) against the lateral extensions 42 and 44, thus forcing the lateral extensions further into the pole-hub gaps 30. After the base wedge-shaped members 50 and 52 are caused to travel axially relative to each to a sufficient degree, the entire assembly of the poles 8, permanent magnets 10, wedge clamps 40 and base wedges 50 and 52 are tightly secured together against radial and tangential movement and to the rotor hub 6. If the edges of the lateral extensions 42 and 44 are tapered, the wedging force exerted by the lateral extensions can be enhanced for greater holding power.

Additionally, the entire assembly of the poles 8, permanent magnets 10, wedge clamps 40 and base wedge-shaped members 50 and 52 are secured against axial movement by means of end plate 60 and 62 which are secured to the axial ends of the rotor hub 6. The endplates 60 and 62 include central openings to accommodate the rotor shaft 4.

It can be appreciated that the base wedge-shaped members 50 and 52 are caused to travel relative to each other by means of an appropriate force. This force can be imparted manually, e.g., by hand or hammering the members 50 and 52 in opposite directions. This force also could be imparted by means of a suitable machine with a hydraulic or other suitable mechanism. It the members 50 and 52 are shorter that the axial length of the space beneath a permanent magnet 10, then it may be necessary to use a removable insert to transfer the force to the members 50 and 52. If the members 50 and 52 are longer than the space beneath a permanent magnet 10, then the members 50 and 52 might need to be trimmed to not extend beyond the axial length of the space. In practice, the lengths of the members 50 and 52 should nearly match the axial length of the space for maximum effect.

The permanent magnets 10 are positioned and sized such that their primary magnetic flux is tangentially alternating oriented relative to the adjacent pole pieces 8. This can be seen by the indications of the orientations of the north and south poles in the drawings. The pole pieces 8 preferably comprise ferromagnetic laminations. The rotor hub 6 is non-magnetic to minimize flux any flux leakage path between two adjacent pole pieces 8.

With reference now to FIG. 3, where portion A of the rotor assembly of FIG. 2 is shown in enlarged view, there is illustrated in greater detail the configurations of the wedge clamp 40 and the base wedges 50 and 52. As illustrated, the lateral extensions 42 and 44 are in part the result of the bending of the edges of the wedge clamp 40. Although other configurations will work, bending of the walls of the clamp members 40 of the walls of the clamp member 40 is a simple way to obtain a good result. The important consideration is to provide for lateral extensions that are able to wedge into the pole-hub gaps 30.

Having described the basic mechanical configuration illustrated in the figures, other aspects and features are described next.

The active torque contributor of the magnetic circuit having the permanent magnets 10 as its source proceeds through the pole pieces 8 up to the air gap located above the apexes 32 of the curved surfaces 30 of the pole pieces 8. The inventive configuration smoothes the magnetic flux and the distribution of the forces in the air gap between the stator and the rotor with the result of decreasing the cogging torque. Additionally, the surfaces 30 of the pole pieces 8 are shaped so as to minimize cogging torque and to limit the harmonic content of the back EMF (electromotive force). The pole pieces 8 preferably are made of stacked laminations to reduce eddy currents that may be induced in the surfaces 30 of the pole pieces 8.

The permanent magnets 10 preferably are rectangular or substantially rectangular in shape with parallel side walls 10a and 10b. The corners of the rectangles may be rounded or beveled, if not sharp right angles. Rectangular magnets are less expensive to manufacture and easier to magnetize. Preferably, the permanent magnetic comprise a magnetic material such as ferrite, NdFeB, ceramic and/or Samarium-Cobalt.

The permanent magnets 10 have their magnetic fields oriented along the short dimension extending between side walls 10a and 10b as illustrated in the figures with the reference letters N and S. The magnetic fields are directed toward the adjacent pole pieces 8. Within the pole pieces 8, the flux path follows a 90 degree rotation towards the surfaces 30 and into the air gap. The magnetization of each successive magnet is circumferentially alternated so that consecutive pole pieces 8 have alternating polarities.

As can be appreciated, the clamps 40 not only restrain the magnets 10 from outward radial movement, but also serve as interfaces protecting the magnets 10 from the rough surfaces of the adjacent poles 8. The lateral extensions 42 and 44 of the clamp members 40 also serve to support each side of the adjacent pole pieces 8 to prevent bending stresses in the stem or vertical extension 16 of the T-shape.

Yet further, the clamps 40 provided axial passages through which resin can be injected, and preferably is injected, at the conclusion of mechanical assembly as a means to protect the magnets 10 and permanently secure all pieces of the assembly.

If manufactured of ferromagnetic material, the magnetic properties of the clamp members 40 also produce a magnetic flux leakage path around the magnets 10. Although this leakage lowers an electric machine's back electromotive force, the overall performance is affected by only a small amount, because it provides similar benefits, when subject to armature reaction, to the internal permanent magnet machines (I PM).

Also, beneficially, the clamps 40 can serve to shield the magnets 10 from demagnetization. When manufactured from ferromagnetic materials, the clamps 40 help reduce the spatial harmonic content of the magnetic flux distribution in the air gap and minimize cogging torque forces.

As mentioned above, the base wedge-shaped members 50 and 52 preferably are non-magnetic and not magnetically permeable to prevent further magnetic shorting of the magnets 10. The advantage of using brass as nonmagnetic material for the base wedge-shaped members 50 and 52 is that high contact points will deform and permit engagement along their entire axial length.

It can also be appreciated that manufacturing tolerances are well accommodated by use of the clamps 40 clamp 5 and base wedge-shaped members 50 and 52 as tighter assembly fits will only allow shallower insertions and looser fits will permit greater insertions. To a great extent, the applied insertion forces on the base wedge-shaped members 50 and 52 control the resulting mechanical forces within the final assembly. Thus, control over the insertion of the base wedge-shaped members 50 and 52 can be used to control the final assembly restraining forces.

Furthermore, no fasteners are needed to radially retain the components, adding simplicity to the reliability and robustness of the invention.

When assembled, but prior to attachment of the end caps 60 and 62, the system preferably is vacuum pressure impregnated with resin into all spaces and gaps, particularly those between the permanent magnets 10 and the clamp members 40, as well as those between the retaining portion 20 and the channel 12. When cured, the resin swells and further locks the permanent magnets into place and protects them from shock and vibration damage. The resin also helps to make up for any other sloppiness or lose tolerances between the parts.

Finally, as mentioned above, the hub 6 might or might not be unitarily formed with the shaft 4. In some applications, such as those involving heavy drilling, a shaft can be subjected to harsh wear and tear because of the application and the connection of the shaft to a gear system. In such applications, it is desirable to have a removable shaft so that the shafts can be replaced and the machine can be put to further use. The present invention easily accommodates this, because the permanent magnets and pole pieces are well retained even were further tolerances are need to accommodate a removable shaft.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A method of manufacturing a rotor retention system, said method comprising:
    providing a rotor hub having a plurality of channel openings formed on an outer circumferential surface of the rotor hub defining a plurality of axially extending channels;
    engaging a plurality of pole pieces extending through the outer circumferential surface of the rotor hub into respective axially extending channels, the rotor hub retaining the plurality of pole pieces against centrifugal forces and defining a plurality of pole-hub gaps on the outer circumferential surface of the rotor hub, each of the pole-hub gaps extending tangentially, with respect to the rotor hub, from below a magnet-facing radially-extending wall of the respective pole piece towards the respective channel opening for that pole piece;
    configuring a plurality of clamp members between consecutive pole pieces, each of the plurality of clamp members having lateral extension portions engaging in the respective pole-hub gaps between the rotor hub and the respective consecutive pole pieces; and
    maintaining a plurality of magnets relative to the rotor hub and between the respective consecutive pole pieces by respective clamp members.

2. The method according to claim 1, further comprising inserting a plurality of base members between respective magnets and the rotor hub.

3. The method according to claim 2, wherein inserting the plurality of base members includes inserting wedge-shaped base members that, when aligned with one another, cause a lateral force to be applied to the clamp members to cause the lateral extension portions to be forced into the pole-hub gaps between the rotor hub and the pole pieces.

4. The method according to claim 3, wherein inserting the wedge-shaped base members includes inserting a pair of wedge-shaped base members between the rotor hub and each magnet.

5. The method according to claim 4, wherein inserting the pair of wedge-shaped base members includes inserting a pair of wedge-shaped base members that are substantially identical in dimensions.

6. The method according to claim 5, wherein inserting the pair of wedge-shaped base members includes inserting trapezoidal wedge-shaped base members.

7. The method according to claim 2, wherein inserting the base members includes inserting base members that, when are aligned with one another, further cause radial forces to be applied to the rotor hub and each magnet.

8. The method according to claim 1, wherein maintaining includes maintaining the magnets into the respective clamp members prior to configuring the clamp members between the pole pieces.

9. A rotor retention system comprising:
    a rotor hub having a plurality of channel openings formed on an outer circumferential surface of the rotor hub defining axially extending channels;
    a plurality of pole pieces extending through the outer circumferential surface of the rotor hub into respective axially extending channels, the rotor hub retaining the pole pieces against centrifugal forces and defining a plurality of pole-hub gaps on the outer circumferential surface of said rotor hub, each of the pole-hub gaps extending tangentially, with respect to the rotor hub, from below a magnet-facing radially-extending wall of the respective pole piece towards the respective channel opening for that pole piece;
    a magnet positioned between consecutive pole pieces; and
    a clamp member configured between the consecutive pole pieces, and having lateral extension portions that are engaging in the pole-hub gaps between said rotor hub and the consecutive pole pieces, said clamp member further configured to maintain said magnet in position between the consecutive pole pieces.

10. The rotor retention system of claim 9, further comprising a plurality of base members positioned between said magnet and rotor hub.

11. The rotor retention system of claim 10, wherein said base members are wedge-shaped and aligned to cause a lateral force to be applied to the lateral extensions of the clamp member to cause the lateral extension portions to be forced into the pole-hub gaps between the rotor hub and the pole pieces.

12. The rotor retention system of claim 11, wherein said base members, when positioned between said rotor hub and magnet, apply radial forces to said magnet and rotor hub.

13. The rotor retention system of claim 12, wherein said base members include a pair of wedge-shaped base members that are substantially identical in dimension.

14. The rotor retention system of claim 13, wherein the wedge-shaped base members are trapezoidal wedge-shaped base members.

15. A rotor retention system comprising:
   a rotor hub defining axially extending channels;
   a first pole piece extending through an outer circumferential surface of the rotor hub into a first of the axially extending channels and a second pole piece extending through the outer circumferential surface of the rotor hub into a second of the axially extending channels, the rotor hub retaining the first pole piece and the second pole piece against centrifugal forces, and defining:
      a first pole-hub gap on the outer circumferential surface of the rotor hub extending tangentially, with respect to the rotor hub, from below a first radially-extending wall of the first pole piece towards the first axially extending channel, the first radially-extending wall of the first pole piece facing towards the second pole piece and
      a second pole-hub gap on the outer circumferential surface of the rotor hub extending tangentially, with respect to the rotor hub, from below a second radially-extending wall of the second pole piece towards the second axially extending channel, the second radially-extending wall of the second pole piece facing towards the first pole piece;
   a magnet positioned between the first pole piece and the second pole piece; and
   a clamp member configured between the first pole piece and the second pole piece, and having a first lateral extension and a second lateral extension that engage in the first pole-hub gap and the second pole-hub gap, respectively, said clamp member further configured to maintain the magnet in position between the first radially-extending wall of the first pole piece and the second radially-extending wall of the second pole piece.

16. A method of manufacturing a rotor retention system, said method comprising:
   providing a rotor hub defining a plurality of axially extending channels;
   engaging a first pole piece extending through an outer circumferential surface of the rotor hub into a first axially extending channel, the rotor hub retaining the first pole piece against centrifugal forces and defining a first pole-hub gap on the outer circumferential surface of the rotor hub extending tangentially, with respect to the rotor hub, from below a first radially-extending wall of the first pole piece towards the first axially extending channel, the first radial radially-extending wall of the first pole piece facing towards a second pole piece;
   engaging the second pole piece extending through an outer circumferential surface of the rotor hub into a second axially extending channel, the rotor hub retaining the second pole piece against centrifugal forces and defining a second pole-hub gap on the outer circumferential surface of the rotor hub extending tangentially, with respect to the rotor hub, from below a second radially-extending wall of the second pole piece towards the second axially extending channel, the second radially-extending wall of the second pole piece facing towards the first pole piece;
   configuring a clamp member between the first pole piece and the second pole piece, the clamp member having a first lateral extension portion and a second lateral extension portion engaging in the first pole-hub gap and the second pole-hub gap, respectively; and
   maintaining a magnet relative to the rotor hub and between the first radially-extending wall of the first pole piece and the second radially-extending wall of the second pole piece by the first clamp member.

17. The method of claim 1, further comprising injecting resin into axial passages provided by the clamp members.

18. The method of claim 16, further comprising injecting resin into an axial passage provided by the clamp member.

* * * * *